(12) United States Patent
Baker et al.

(10) Patent No.: US 7,832,986 B2
(45) Date of Patent: Nov. 16, 2010

(54) MULTI-ALLOY TURBINE ROTORS AND METHODS OF MANUFACTURING THE ROTORS

(75) Inventors: William C. Baker, Phoenix, AZ (US); Thomas E. Strangman, Prescott, AZ (US); Derek A. Rice, Phoenix, AZ (US); James S. Perron, Fountain Hills, AZ (US); Christopher Zollars, Tempe, AZ (US)

(73) Assignee: Honeywell International Inc., Morristown, NJ (US)

( * ) Notice: Subject to any disclaimer, the term of this patent is extended or adjusted under 35 U.S.C. 154(b) by 871 days.

(21) Appl. No.: 11/715,039

(22) Filed: Mar. 7, 2007

(65) Prior Publication Data

US 2008/0219853 A1 Sep. 11, 2008

(51) Int. Cl.
*F01D 5/08* (2006.01)
(52) U.S. Cl. ............... 416/96 R; 416/97 R; 416/213 R; 416/234
(58) Field of Classification Search ............... 416/96 R, 416/97 R, 213 R, 234
See application file for complete search history.

(56) References Cited

U.S. PATENT DOCUMENTS

| 2,914,841 | A |   | 12/1959 | Graham |
| 3,044,745 | A |   | 7/1962 | Stark |
| 3,606,573 | A |   | 9/1971 | Emmerson et al. |
| 4,096,615 | A |   | 6/1978 | Cross |
| 4,152,816 | A |   | 5/1979 | Ewing et al. |
| 4,186,473 | A | * | 2/1980 | Cross et al. ................. 29/889.2 |
| 4,270,256 | A | * | 6/1981 | Ewing ...................... 29/889.21 |
| 4,335,997 | A | * | 6/1982 | Ewing et al. ................. 416/185 |
| 4,494,287 | A |   | 1/1985 | Cruzen et al. |
| 4,587,700 | A |   | 5/1986 | Curbishley et al. |
| 4,784,573 | A |   | 11/1988 | Ress, Jr. |
| 4,907,947 | A |   | 3/1990 | Hoppin, III |
| 2005/0232780 | A1 |   | 10/2005 | Newman |

* cited by examiner

*Primary Examiner*—Ninh H Nguyen
(74) *Attorney, Agent, or Firm*—Ingrassia Fisher & Lorenz, P.C.

(57) ABSTRACT

A dual alloy turbine rotor is provided and includes an integrally formed blade ring and a disk. The blade ring is made of a first alloy and includes a ring portion and a plurality of airfoils extending therefrom, where the ring portion includes an inner surface, and each airfoil includes an internal cavity formed therein. The disk is made of a second alloy and may have a beveled outer peripheral surface. The disk is disposed within the ring portion such that the disk outer peripheral surface contacts at least a portion of the ring portion inner surface. Methods of manufacturing the turbine rotor are also provided.

3 Claims, 8 Drawing Sheets

MULTI-ALLOY TURBINE ROTORS AND METHODS OF MANUFACTURING THE ROTORS

TECHNICAL FIELD

The inventive subject matter relates to turbine rotors and, more particularly, to multi-alloy turbine rotors and methods of manufacturing the rotors.

BACKGROUND

Gas turbine engines may be used to power various types of vehicles and systems, such as air or land-based vehicles. In typical gas turbine engines, compressed air generated by axial and/or radial compressors is mixed with fuel and burned, and the expanding hot combustion gases are directed against stationary turbine vanes in the engine. The gas flow deflects off of the vanes and impinges upon turbine blades of a turbine rotor. A rotatable turbine disk or wheel, from which the turbine blades extend, spins at high speeds. Gas turbine engines used in aircraft use power created by the rotating disk to draw more air into the engine and to pass high velocity combustion gas out of the gas turbine aft end to produce a forward thrust. Other gas turbine engines may use the power to turn a propeller or an electrical generator.

The engines may incorporate dual alloy turbine rotors. A dual alloy turbine rotor may include airfoils and outer rim rotor portions made of a first material having a desired characteristic and a hub made of a second material having another desired characteristic. For example, the airfoils and outer rim portions may include an alloy having relatively high creep rupture strength at the high temperatures, while the hub may be made of another alloy having high tensile strength and low-cycle-fatigue resistance properties.

To produce the dual alloy turbine rotors, a unitary blade ring made up of a ring of the airfoils is typically formed. The hub, which is fabricated separately from the blade ring, is then hot isostatically pressed, or otherwise bonded thereto. Manufacturing the dual alloy turbine rotor in the aforementioned manner has been relatively cost efficient and simple to perform.

The aforementioned dual alloy turbine rotors and manufacturing process may have several advantages, however, they may also have drawbacks. In some engines, for example, it would be desirable to operate dual alloy turbine rotors at gas temperatures that may be near or above an incipient melting point of one or both of the alloys. However, when subjected to these gas temperatures, the alloys may not exhibit the characteristics for which they were initially selected. Additionally, as the demand for more efficient and lightweight engines increases, inclusion of a dual alloy turbine rotor into an engine may not be feasible, as such rotors may be relatively heavier than conventional rotors.

Hence, there is a need for a dual alloy turbine rotor that may be used in extreme high temperatures. Moreover, it is desirable for the dual alloy turbine rotor to be relatively inexpensive, lightweight, and simple to manufacture.

BRIEF SUMMARY

In accordance with an embodiment, the inventive subject matter provides method of manufacturing a dual alloy turbine rotor including a plurality of airfoils extending radially outwardly therefrom, wherein each airfoil has internal cavities formed therein and an outer surface. The method includes forming a plurality of ceramic cores each shaped to complement at least one airfoil internal cavity, placing each ceramic core of the plurality of ceramic cores in a cavity of a corresponding wax pattern die, the corresponding wax pattern die having an inner surface shaped to complement the airfoil outer surface to form a wax pattern airfoil, and injecting wax into each corresponding wax pattern die cavity to form a plurality of wax pattern airfoils. The method also includes assembling the wax pattern airfoils into a ring, forming a ceramic mold around the assembled ring, removing the wax from the ring to expose a mold cavity and plurality of ceramic cores, disposing a first metal alloy in the mold cavity, removing the mold and ceramic cores to expose a metal blade ring with internal cavities, and bonding a disk to a ring portion of the metal blade ring, the disk comprising a second metal alloy.

In accordance with another embodiment, a method of manufacturing a multi-alloy turbine rotor including a plurality of airfoils extending radially outwardly therefrom is provided. The method may include forming the plurality of airfoils, each airfoil comprising a first alloy and having a internal cavity formed therein. The method may also include coating at least a portion of each airfoil with an oxidation-resistant coating. Additionally, the method may include bi-casting the plurality of airfoils to form a blade ring. A disk comprising a second alloy may be bonded to the blade ring to form the multi-alloy turbine rotor.

In accordance with still another embodiment, the blade ring is made of a first alloy and includes a ring portion and a plurality of blades extending therefrom. The ring portion includes a side surface and an inner surface, and each blade includes an internal cavity formed therein. The disk is made of a second alloy disposed within the ring portion such that the disk outer peripheral surface contacts at least a portion of the ring portion inner surface.

Other independent features and advantages of the preferred methods and rotor will become apparent from the following detailed description, taken in conjunction with the accompanying drawings which illustrate, by way of example, the principles of the inventive subject matter.

DETAILED DESCRIPTION OF A PREFERRED EMBODIMENT

The following detailed description of the inventive subject matter is merely exemplary in nature and is not intended to limit the inventive subject matter or the application and uses of the inventive subject matter. Furthermore, there is no intention to be bound by any theory presented in the preceding background of the inventive subject matter or the following detailed description of the inventive subject matter.

Figure 1:
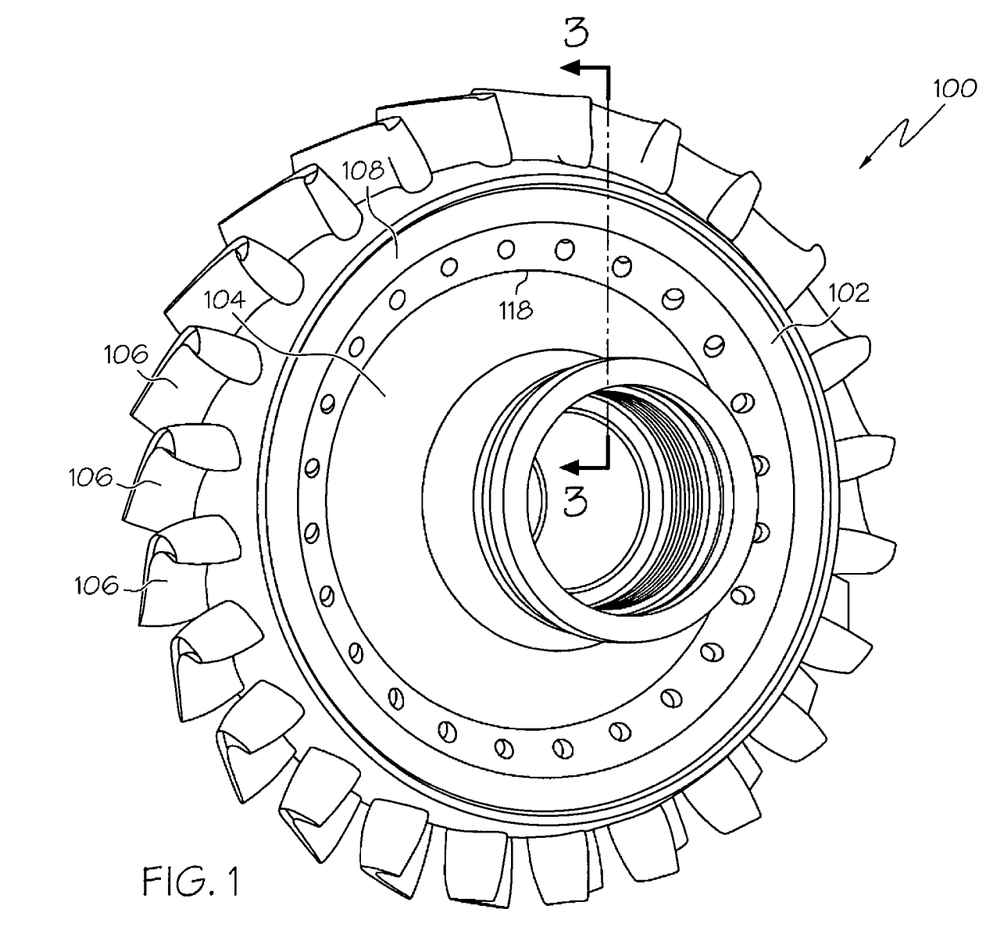
FIG. 1 is a perspective view of a dual alloy turbine rotor, according to an embodiment.
Figure 2:
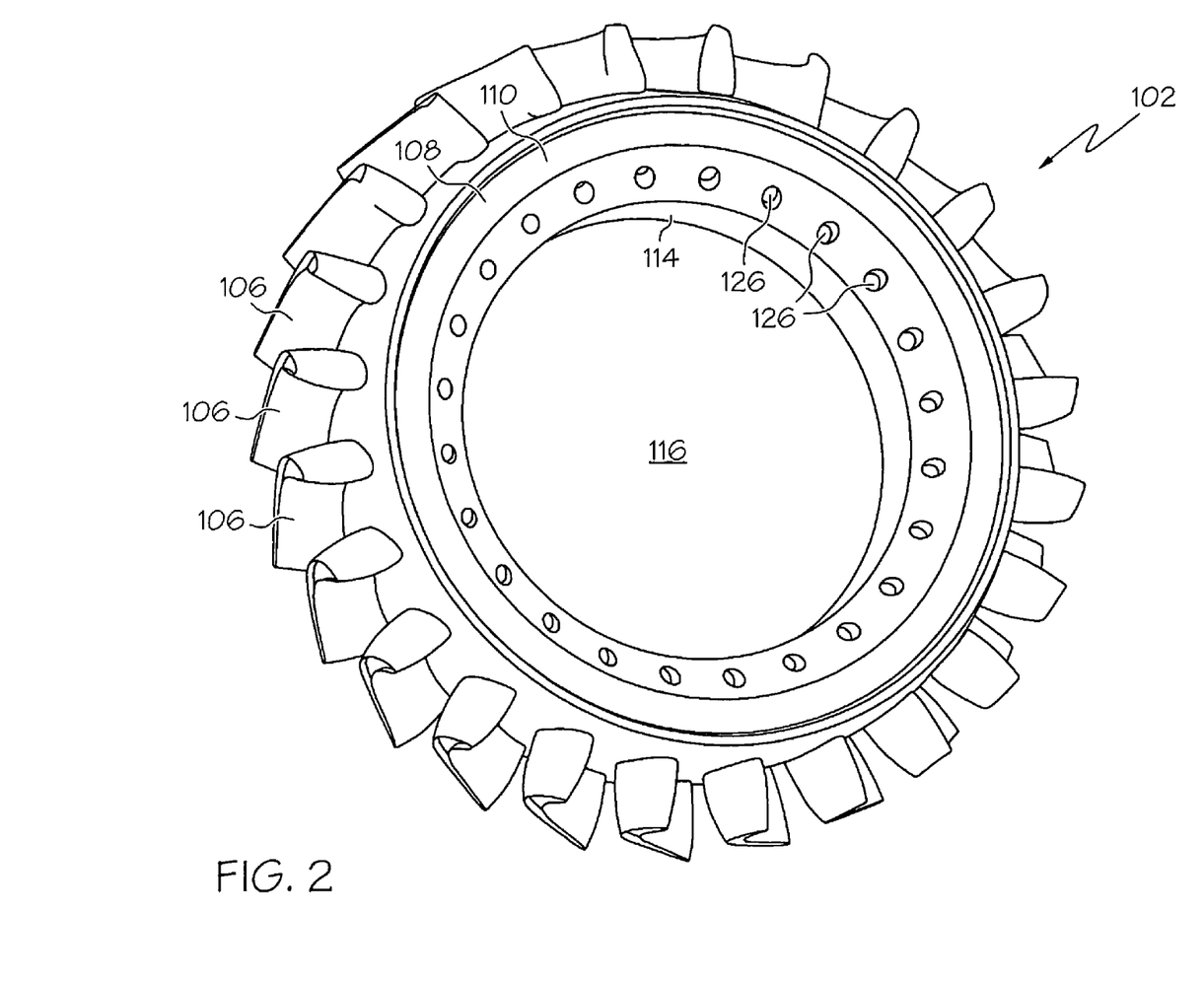
FIG. 2 is a perspective view of a blade ring that may be incorporated into a dual alloy turbine rotor, according to an embodiment.
Figure 3:
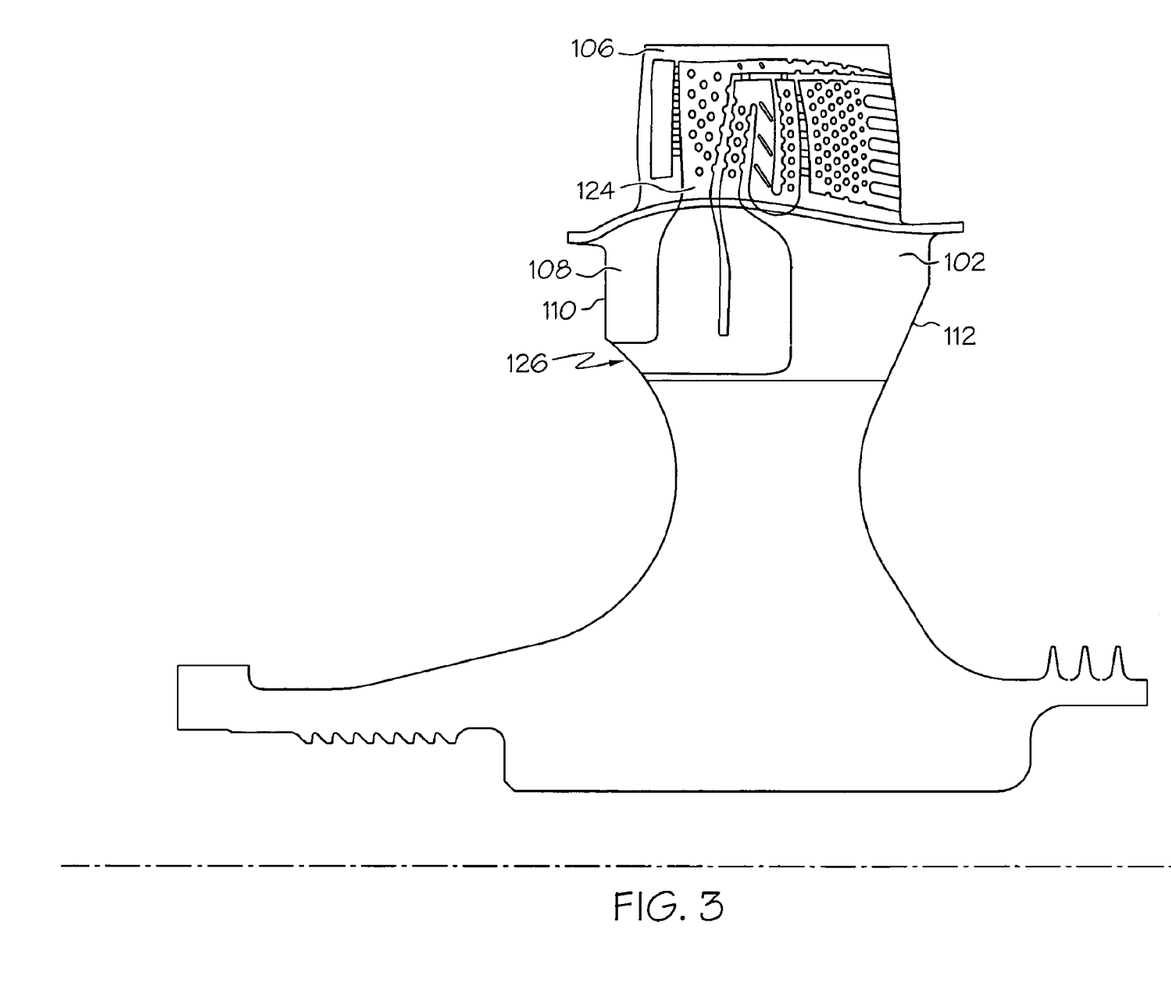
FIG. 3 is a cross section view of a portion of a blade including an internal cooling circuit that may be incorporated into the turbine rotor shown in FIG. 1 along line 3-3, according to an embodiment.
Figure 4:
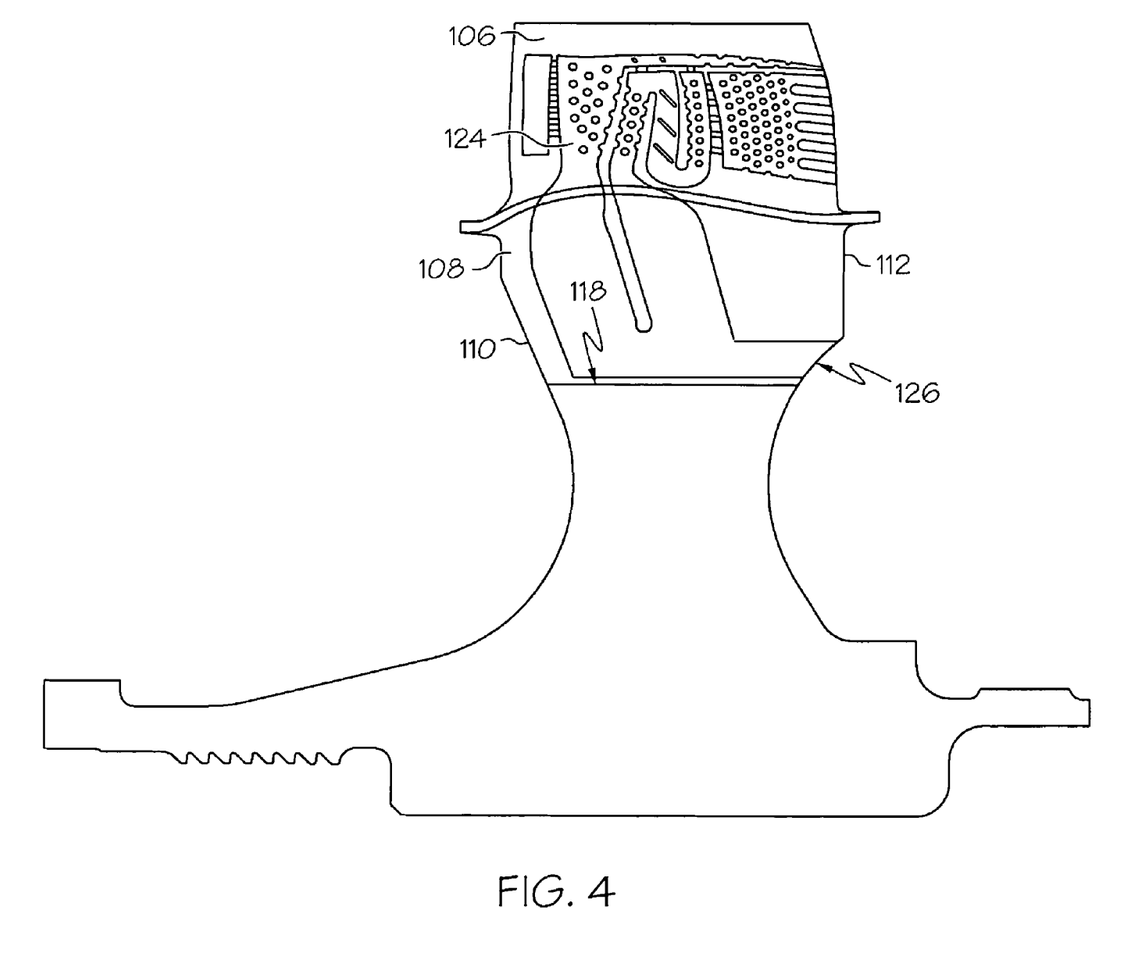
FIG. 4 is a cross section view of a portion of a blade including an internal cooling circuit that may be incorporated into the turbine rotor shown in FIG. 1 along line 3-3, according to another embodiment.

Referring now to FIGS. 1 and 2, a perspective view of a dual alloy turbine rotor 100 and a perspective view of a blade ring 102, respectively, are illustrated according to an embodiment. The dual alloy turbine rotor 100 includes a blade ring 102 bonded to a disk 104, and at least the blade ring 102 and the disk 104 may be made of different materials. Suitable materials that may be used for manufacturing the blade ring 102 or the disk 104 include, but are not limited to superalloys, such as nickel-based superalloys, that are equi-axed, uni-directional, or single crystal. The uni-directional and single crystal materials may each have a preferential crystal orientation.

The blade ring 102 may be integrally formed and includes a plurality of airfoils 106 that extend radially outwardly from a ring portion 108. The ring portion 108 has inlets 126 formed therein and an inner annular surface 114 that defines an opening 116. The disk 104 is disposed within the opening 116 and has an outer peripheral surface 118 that is bonded to the ring portion inner annular surface 114. In an embodiment, the disk 104 may have an outer peripheral surface 118 that lies substantially flush against the blade ring 102 when the disk 104 is disposed in the opening 116.

Figure 5:
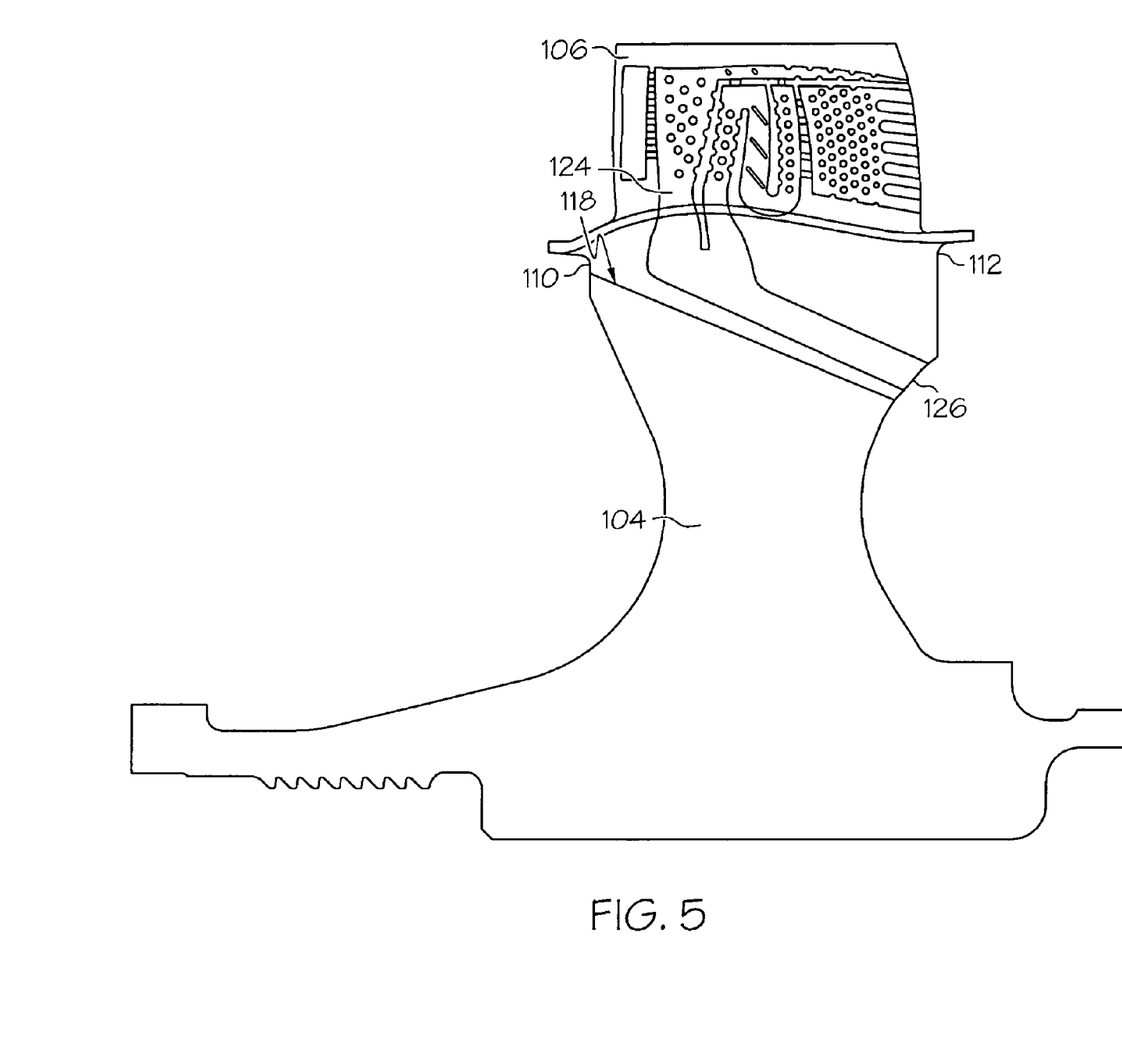
FIG. 5 is a cross section view of a portion of a blade including an internal cooling circuit that may be incorporated into the turbine rotor shown in FIG. 1 along line 3-3, according to another embodiment.
Figure 6:
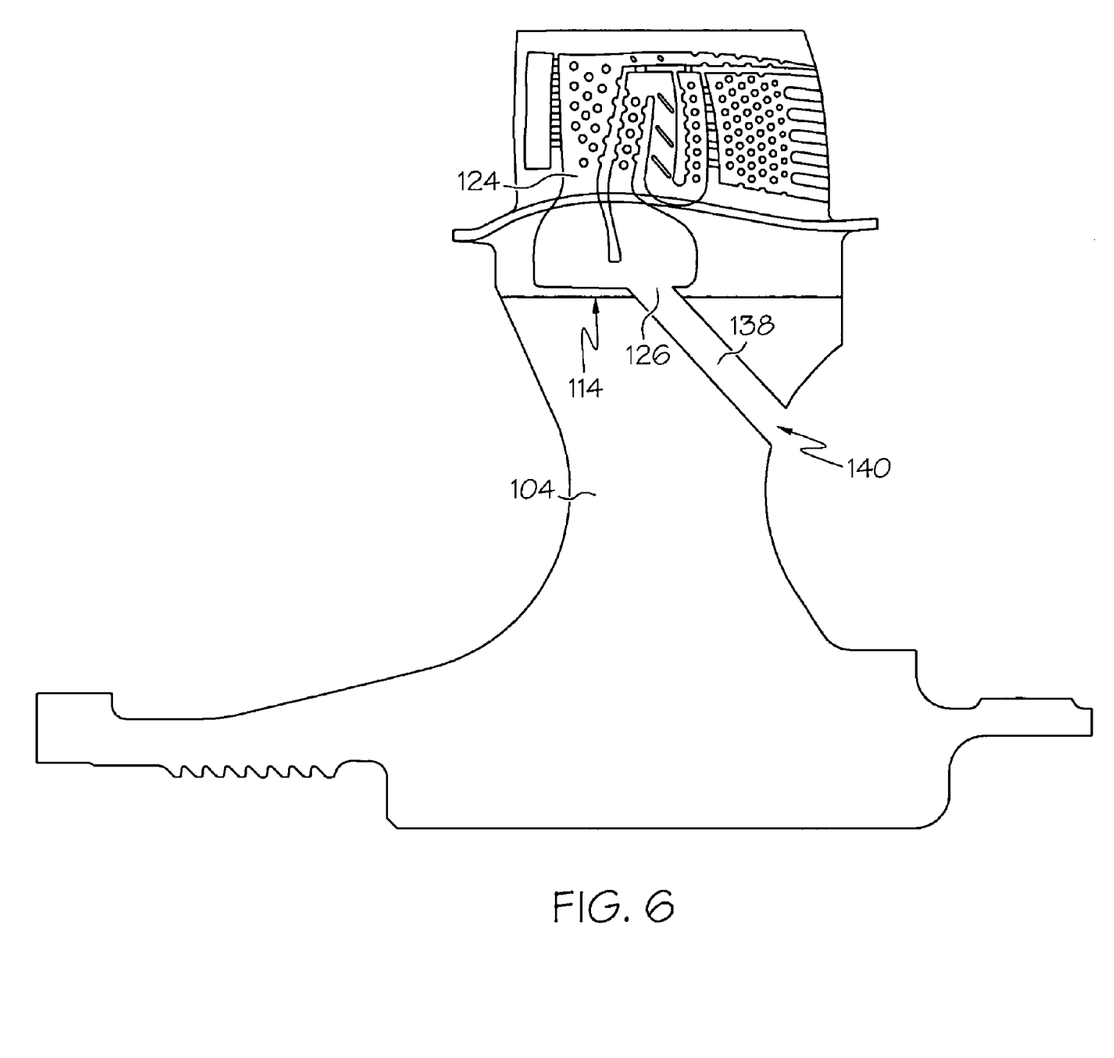
FIG. 6 is a cross section view of a portion of a blade including an internal cooling circuit that may be incorporated into the turbine rotor shown in FIG. 1 along line 3-3, according to another embodiment.

The blade ring 102 may include internal cavities 124 formed in each airfoil 106 and ring portion 108, as shown in FIGS. 3-6. In an embodiment, the internal cavities 124 may be employed to decrease the weight of the rotor 100, as compared to conventional rotors with solid airfoils. In another embodiment, the internal cavities 124 may make up a portion of an internal cooling system. Each internal cooling circuit may be configured to ingest air from an airflow traveling across the dual alloy turbine rotor 100 and to direct the air through a corresponding airfoil 106. In this regard, each internal cavity 124 may include a corresponding inlet 126 that may be formed on the blade ring 102. In an embodiment, the inlet 126 may be formed on a forward surface 110 of the blade ring 102 (FIG. 3) or alternatively, on an aft surface 112 of the blade ring 102 (shown in FIG. 4). In another embodiment, the disk 104 has a beveled outer peripheral surface 118 as illustrated in FIG. 5, and the inlets 126 may be formed on the forward or aft surface 112. In still another embodiment, each inlet 126 may be in flow communication with a corresponding passage 138 formed through the disk 104, as shown in FIG. 6. The disk passage 138 includes an inlet 140 so that a portion of air flowing against the disk 104 may thus be directed into and ingested by the internal cavity 124.

Figure 7:
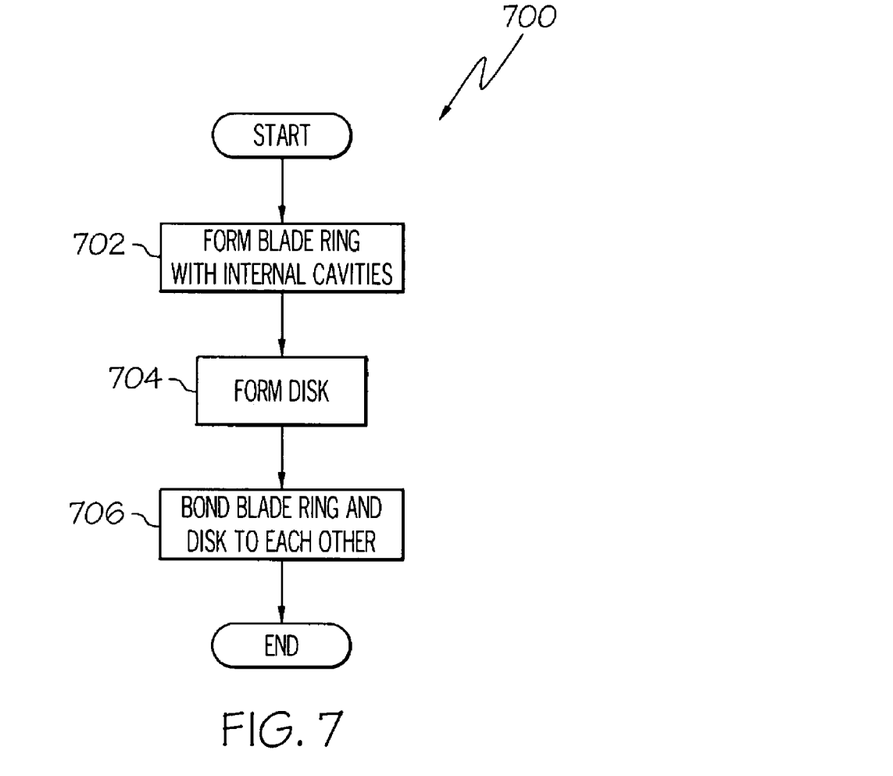
FIG. 7 is a flow diagram of a method of making the turbine rotor, according to an embodiment.

In an embodiment, the dual alloy turbine rotor 100 described above may be formed using a method 700 depicted in FIG. 7. In an embodiment of the method 700, the blade ring 102 is formed, step 702. Additionally, the disk 104 is formed, step 704. Then, the blade ring 102 and disk 104 are bonded to each other, step 706.

As briefly mentioned, the blade ring 102 is formed, step 702. An embodiment of a method 800 for forming the blade ring 102 is illustrated in a flow diagram shown in FIG. 8. In this embodiment, a plurality of ceramic cores is first formed, step 802. Each ceramic core is shaped to complement at least one internal cavity 124.

Figure 8:
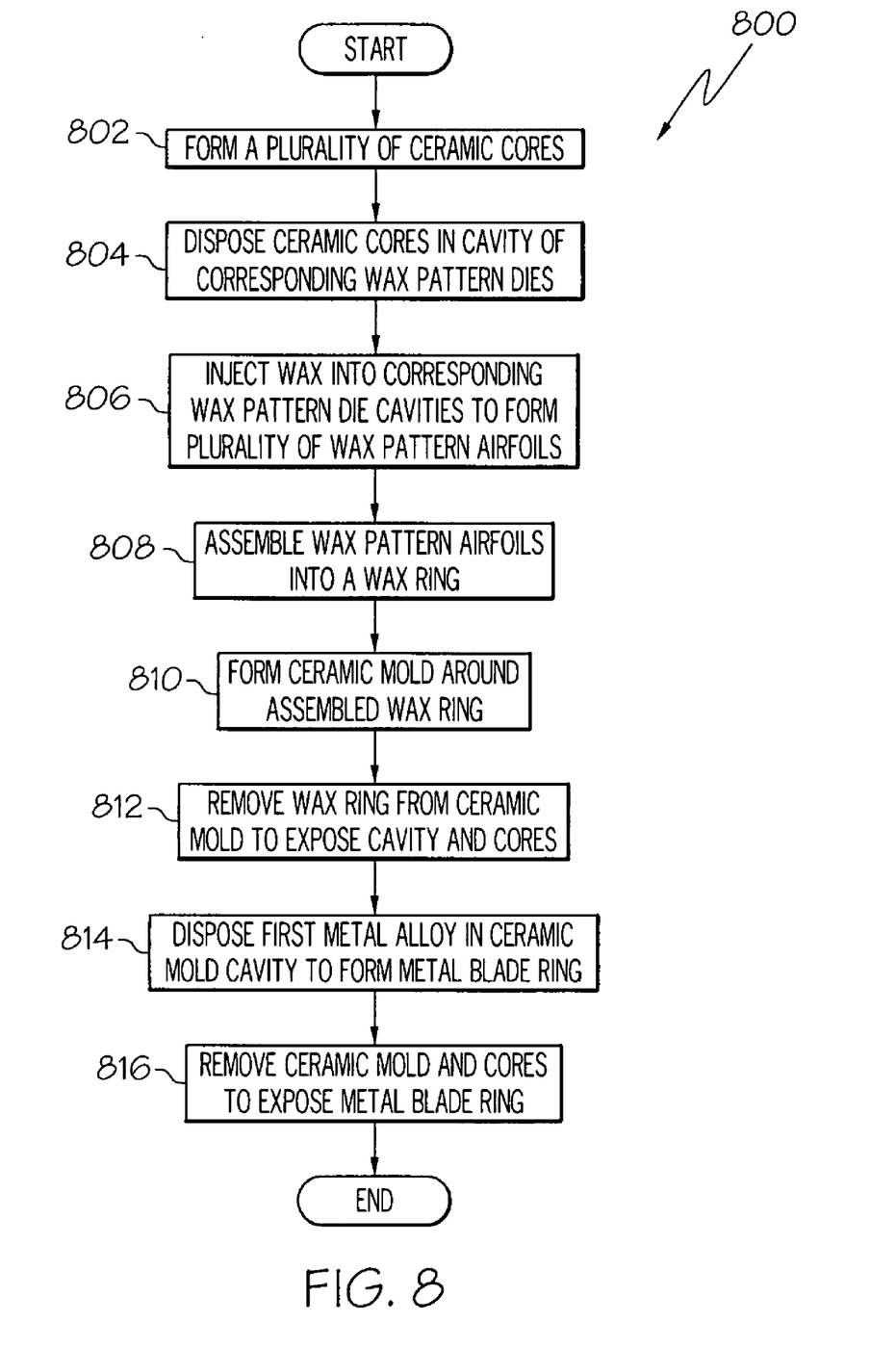
FIG. 8 is a flow diagram of a method of making a blade ring, according to an embodiment.

The ceramic cores are each placed in a cavity of a corresponding wax pattern die, step 804. The corresponding wax pattern die has an inner surface shaped to complement an airfoil outer surface to form a wax pattern airfoil. In an embodiment in which the inlets 126 are to be formed on the airfoil 106 (e.g., on a forward surface 110, or aft surface 112 of the blade ring 102), the ceramic cores are placed in contact with an appropriate portion of the wax pattern die inner surface.

Next, wax is injected into each corresponding wax pattern die cavity to form a plurality of wax pattern airfoils with ceramic cores disposed therein, step 806. The wax pattern airfoils are then assembled into a wax ring with each wax airfoil extending radially outwardly, step 808. In an embodiment, each of the wax pattern airfoils is adhered to another. It will be appreciated that the any number of wax pattern airfoils may be employed to form the blade ring.

A ceramic mold is then formed around the assembled wax ring, step 810. In an embodiment, the assembled wax ring is coated with a combination of ceramic slurry and ceramic stucco. The assembled ring may be coated more than once. After coating, the ceramic mold is dried to thereby form a ceramic outer shell around the assembled wax ring.

The wax ring is removed from the ceramic mold to expose a cavity having the ceramic cores disposed therein, step 812. In an embodiment, the wax may be heated to phase change into a liquid or vapor. The liquid or vapor may then be removed from the ceramic mold. In another embodiment, the wax may be chemically leeched out of the ceramic mold.

Next, a first metal alloy is disposed in the ceramic mold cavity to form a metal blade ring 102, step 814. The first metal alloy may be a molten form of one of the metal alloys mentioned above that may be used to form the airfoils 106 and the ring portion 108. In an embodiment, the first metal alloy may be a nickel-based superalloy that is suitable for forming an equi-axed, directionally solidified polycrystal, or single crystal component.

The step of disposing the molten first metal alloy may include growing at least one airfoil that is made up of a single crystal having a predetermined crystal orientation in one or more directions. In this regard, at least one seed crystal having the predetermined crystal orientation is first placed in an appropriate section of the ceramic mold cavity. By controlling the temperature and rate at which crystal growth occurs, the airfoil 106 may, consequently, be made of a single crystal having the predetermined crystal orientation. In another embodiment, the step of disposing the molten first metal alloy may include casting an equi-axed blade ring in the mold cavity. In still another embodiment, the step of disposing the molten first metal alloy may include growing a directionally solidified blade ring having at least one airfoil that is made up of a directionally solidified poly-crystal having a predetermined crystal orientation. The directionally solidified blade ring may be formed by growing a directionally solidified poly-crystal having grain boundaries that are parallel to a stress axis of the airfoil. Temperature and rate of growth are controlled to ensure appropriate crystal growth.

In any case, the molten first metal alloy is disposed in the cavity such that it substantially covers the blade cavity portions of the ceramic cores. In embodiments in which portions of the ceramic core form inlets 126, those portions may not be covered with the molten first metal alloy. The molten metal alloy is then cooled that it may become solidifed.

After cooling, the ceramic mold and cores are removed to expose the blade ring 102, step 816. Consequently, cavities are left in the blade ring 102 forming the internal cavities 124. In an embodiment, removal of the outer mold also exposes the internal cavity inlets 126 that may be formed in the airfoils 106 (e.g., on a forward surface 110 or aft surface 112 of the blade ring 102).

The ceramic cores and mold may be either chemically or mechanically removed. In an embodiment, a composition formulated to degrade ceramic may be used to dissolve the ceramic cores and the mold. Upon successful removal of the ceramic mold, the core material may be leached out using a traditional caustic solution, such as sodium or potassium hydroxide, as is common in the core removal industry. Verification of core removal may be accomplished using a combination of water flow, air flow, N-ray, and thermal imaging inspections.

Figure 9:
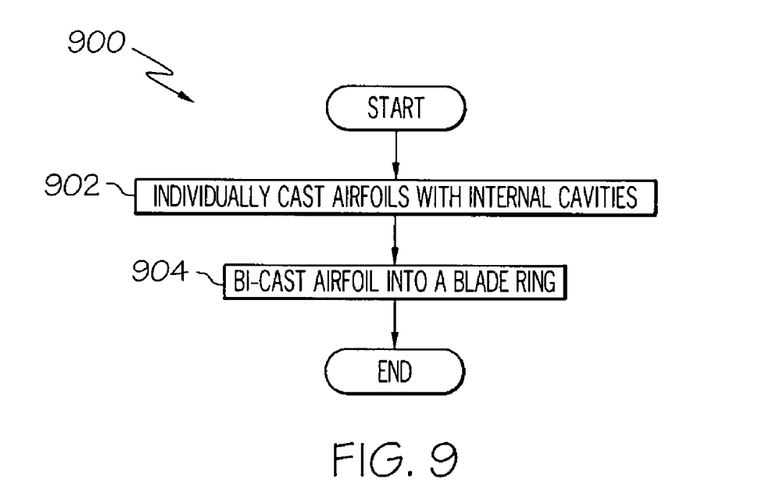
FIG. 9 is a flow diagram of a method of making a blade ring, according to another embodiment.

In another embodiment of method 700, the dual alloy turbine rotor may be manufactured using method 900 shown in FIG. 9. In this embodiment, the airfoils 106 may be individually cast, step 902. The airfoils 106 may then be bi-cast into a blade ring, step 904.

The airfoils 106, including internal cavities 124 and inlets 126 therein, may be cast by employing a conventional casting technique, such as an investment casting technique. Before or after the airfoils 106 are cast, oxide scale may form on the airfoils 106. Accordingly, prior to step 902, any oxide scale may be removed from the surface of the airfoils 106, e.g., using an acid, and thereafter the airfoils 106 may be cleaned, e.g., with surfactant and/or acid. Additionally, at least a portion of the airfoils 106 may be coated with an oxidation-resistant coating that may prevent formation of an oxide scale. In an embodiment, the oxidation-resistant coating may include a platinum group metal, e.g., platinum, palladium, rhodium, ruthenium, osmium, and iridium, or a mixture thereof.

The oxidation-resistant coating may be applied to the surface of the airfoils 106 by any one of various deposition techniques, including, but not limited to electroplating, chemical vapor deposition, and ion plating. In an embodiment, the oxidation-resistant coating may be applied sequentially in a series of layers. The layers may have the same or different compositions, and may be applied using various deposition techniques, to form an oxidation-resistant coating, having suitable thickness, and adhesion to the airfoil superalloy.

As mentioned above, the airfoils 106 may be bi-cast into a blade ring, step 904. In an embodiment, a portion of the airfoil may be diffusion bonded to another airfoil. In another embodiment, the airfoils 106 may be subjected to heat treatment in which the airfoils 106 may be further diffusion bonded to form the blade ring. For example, the heat treatment may include hot isostatic pressing (HIP) of the airfoils to thereby form the blade ring. The heat treatment may be performed at a temperature in the range of from about 2000 to 2350° F. (about 1090 to 1290° C.), and at a pressure of from about 15 to 30 ksi for about 2 to 8 hours, or from about 2100 to 2300° F. (about 1150 to 1260° C.) at a pressure of from about 20 to 30 ksi for about 2 to 6 hours.

In embodiments in which the blade cooling circuit inlets 126 are not formed in the blades 106, they may be machined into desired portions thereof. For example, the inlets 126 may be machined into a forward surface 130, aft surface 132, or inner annular surface 110 of the blades 106.

Returning to FIG. 5, as mentioned above, the disk 104 is also formed, step 704. The disk 104 may be a wrought member and may be either forged or compacted from loose pre-alloyed powder or pre-consolidated powder, or made using other suitable formation processes. In an embodiment, the disk 104 is made of a second metal alloy that is different than that of the blade ring 102. The second metal alloy may be a nickel-based alloy, such as a polycrystalline superalloy.

In an embodiment, the disk 104 and blade ring 102 may be match-machined into an intermediate form. For example, in an embodiment in which the inner surface 114 of the blade ring 106 and the outer peripheral surface 118 of the disk 104 are both beveled, each surface 114, 118 may be appropriately match-machined so that the two surfaces 114, 118 may be substantially flush after disk 104 insertion. The disk 104 and blade ring 102 may also be match-machined when the inner surface 114 and outer peripheral surface 118 are not beveled.

Next, the disk 104 and blade ring 102 are bonded to each other, step 706. The bond between the disk 104 and blade ring 102 may be a direct metallurgical bond. In an embodiment, the disk 104 and the blade ring 102 are diffusion bonded. In diffusion bonding, the outer peripheral surface 118 of the disk 104 and the inner surface 114 of the blade ring 102 are cleaned to thereby remove contaminants, such as oxides, that may disrupt or interfere with the bonding. The suitably cleaned disk 104 is then inserted into the blade ring 102, a vacuum seal is affected between the inner surface 114 of the blade ring 102 and the outer peripheral surface 118 of the disk 104, and the two are held under a hot isostatic pressure load at an elevated temperature. Suitable pressures at which the disk 104 and blade ring 102 may be held may be in a range of between about 15 to about 30 ksi. Suitable temperatures for the diffusion bonding process may be in a range of between about 2000 to 2350° F. (about 1090 to 1290° C.). Other forms of diffusion bonding may alternatively be employed.

In another embodiment, the disk 104 and blade ring 102 may be inertia friction welded. In such case, the disk 104 or blade ring 102 is rotated at a relatively high speed around an axis, while the non-rotating component is contacted therewith. A load is then applied to the non-rotating component to thereby force the rotating and non-rotating components together. In still another embodiment, the disk 104 and blade ring may be electron beam welded. Here, the disk 104 is inserted into the blade ring 102, and a high energy beam is impinged at a joint between the disk 104 and the blade ring 102. Subsequent to either inertia weld or electron beam weld the assembly is HIP diffusion bonded to ensure a structural metallurgical bond.

After the disk 104 and blade ring 102 are bonded together, they may undergo a final machining process. In an embodiment, the disk passages 138 and inlets 126, if not already formed, may be machined into the multi-alloy turbine rotor to communicate with respective internal cavity 124. In another embodiment, if not already exposed, the internal cavity inlets 126 that may be formed on the blade ring 102 (e.g., on a forward surface 110 or aft surface 112 of the blade ring 102) may be machined into the turbine rotor 100 to communicate with respective internal cavity 124. In either case, an inspection, such as via x-ray or external locating marks, may be performed to identify precise locations of where the disk passages 138 or the internal cavity inlets 126 should be machined.

A dual alloy turbine rotor 100 has now been provided that is a dual alloy component and that, with the inclusion of the internal cavities 124, may be used in extreme high gas temperature applications (e.g., greater than 1800° F. (about 980° C.)) or for weight reduction or internal cooling. The dual alloy turbine rotor 100 is relatively simple and inexpensive to manufacture.

While the inventive subject matter has been described with reference to a preferred embodiment, it will be understood by those skilled in the art that various changes may be made and equivalents may be substituted for elements thereof without departing from the scope of the inventive subject matter. In addition, many modifications may be made to adapt to a particular situation or material to the teachings of the inventive subject matter without departing from the essential scope thereof. Therefore, it is intended that the inventive subject matter not be limited to the particular embodiment disclosed as the best mode contemplated for carrying out this inventive subject matter, but that the inventive subject matter will include all embodiments falling within the scope of the appended claims.

We claim:

1. A dual alloy turbine rotor comprising:
   an integrally formed blade ring comprising a first alloy and including a ring portion and a plurality of airfoils extending therefrom, the ring portion including an inner annular surface, and each airfoil including an internal cavity formed therein;
   a disk comprising a second alloy disposed within the ring portion and having an outer peripheral surface substantially flush against at least a portion of the ring portion inner annular surface to form a bond line between the outer peripheral surface of the disk and the inner annular surface of the ring portion; and
   a plurality of passages extending from a side surface of the disk through the bond line to communicate with corresponding internal cavities of the plurality of airfoils.

2. The dual alloy turbine rotor of claim 1, wherein the side surface is a forward side surface and each passage of the plurality of passages has an inlet formed on the forward side surface.

3. The dual alloy turbine rotor of claim 1, wherein the side surface is an aft side surface and each passage of the plurality of passages has an inlet formed on the aft side surface.

* * * * *